(12) United States Patent
Vihar et al.

(10) Patent No.: US 11,522,967 B2
(45) Date of Patent: Dec. 6, 2022

(54) SYSTEM METAMODEL FOR AN EVENT-DRIVEN CLUSTER OF MICROSERVICES WITH MICRO FRONTENDS

(71) Applicant: SAP SE, Walldorf (DE)

(72) Inventors: Sathish Babu Krishna Vihar, Bangalore (IN); Balaji Vummiti, Bangalore (IN); Venkiteswaran Balakrishnan, Bangalore (IN)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 17/104,598

(22) Filed: Nov. 25, 2020

(65) Prior Publication Data

US 2022/0166839 A1 May 26, 2022

(51) Int. Cl.
*H04L 67/51* (2022.01)
*G06F 9/54* (2006.01)
(Continued)

(52) U.S. Cl.
CPC ............ *H04L 67/51* (2022.05); *G06F 9/5077* (2013.01); *G06F 9/542* (2013.01); *G06F 9/547* (2013.01);
(Continued)

(58) Field of Classification Search
CPC ......... H04L 67/16; H04L 61/51; H04L 41/50; H04L 61/30; H04L 61/50; H04W 4/00;
(Continued)

(56) References Cited

U.S. PATENT DOCUMENTS 8,224,697 B2 7/2012 Verma et al.
9,191,343 B2 11/2015 Stollarski et al.
(Continued)

FOREIGN PATENT DOCUMENTS

WO WO-2019082085 A1 * 5/2019 ............ G06F 9/455

OTHER PUBLICATIONS

U.S. Appl. No. 17/128,957 filed, Dec. 21, 2020, Vihar et al.
(Continued)

*Primary Examiner* — James N Fiorillo
(74) *Attorney, Agent, or Firm* — Fish & Richardson P.C.

(57) ABSTRACT

The present disclosure involves systems, software, and computer implemented methods for defining and using a system metamodel for an event-driven cluster of microservices. A deployment package that includes metadata definitions is received for a microservice. The metadata definitions include: a reference to a service; a reference to a resource entity served by the service; a reference to an event subscribed to by the service; a reference to a micro frontend that provides a user interface for the service; and a reference to an API for performing operations on the resource entity. The microservice is deployed, which includes including the metadata definitions in a system metamodel graph. The microservice is activated, including generating at least one event corresponding to including the metadata definitions in the system metamodel graph. In response to a request for metadata for the microservice, the system metamodel graph is traversed to retrieve the requested metadata.

14 Claims, 18 Drawing Sheets

(51) Int. Cl.
*G06F 16/901* (2019.01)
*G06F 9/50* (2006.01)

(52) U.S. Cl.
CPC .... *G06F 16/9024* (2019.01); *G06F 2209/505* (2013.01)

(58) Field of Classification Search
CPC ... G06F 9/50; G06F 9/54; G06F 9/455; G06F 9/542; G06F 9/547; G06F 9/5077; G06F 16/901; G06F 16/9024; G06F 16/9027; G06F 2209/505
USPC ........................................................ 709/223
See application file for complete search history.

(56) References Cited

U.S. PATENT DOCUMENTS

| | | | |
|---|---|---|---|
| 9,191,357 | B2 | 11/2015 | Stollarski et al. |
| 10,528,367 | B1* | 1/2020 | Liu ....................... G06F 9/4498 |
| 2007/0112574 | A1* | 5/2007 | Greene ................. H04W 12/03 709/201 |
| 2014/0278626 | A1 | 9/2014 | Stollarski et al. |
| 2014/0279413 | A1 | 9/2014 | Stollarski et al. |
| 2018/0039565 | A1* | 2/2018 | Rajagopalan ....... G06F 11/3476 |
| 2018/0165604 | A1* | 6/2018 | Minkin ................. G06Q 10/06 |
| 2018/0365008 | A1* | 12/2018 | Chandramouli .......... G06F 8/76 |
| 2019/0052549 | A1* | 2/2019 | Duggal ............... H04L 41/5019 |
| 2019/0171438 | A1* | 6/2019 | Franchitti .............. G06N 20/00 |
| 2019/0220331 | A1* | 7/2019 | Duggal ................. G06F 9/5072 |
| 2019/0320038 | A1* | 10/2019 | Walsh ..................... G06F 9/542 |
| 2020/0067800 | A1* | 2/2020 | Wang ..................... H04L 41/12 |
| 2020/0228402 | A1* | 7/2020 | Parker ................. G06F 9/45533 |
| 2020/0272428 | A1* | 8/2020 | Katakam ................ G06F 9/542 |
| 2021/0136120 | A1* | 5/2021 | Crabtree ............. G06F 16/9024 |
| 2021/0271522 | A1* | 9/2021 | Butterworth .......... H04L 45/123 |
| 2021/0360083 | A1* | 11/2021 | Duggal .................. H04L 67/34 |

OTHER PUBLICATIONS

Klyne, et al., "Date and Time on the Internet: Timestamps" Request 3339, Network Working Group, Jul. 2002, 18 pages.

Semver.org [online], "Semantic Versioning 2.0.0 | Semantic Versioning" Dec. 2009 [retrieved on Feb. 11, 2021], retrieved from: URL <https://semver.org/>, 7 pages.

Unece.org [online], "Specification CCTS DT Catalogue Version 3.1" Oct. 2011 [retrieved on Feb. 11, 2021], retrieved from: URL <https://unece.org/fileadmin/DAM/cefact/codesfortrade/CCTS/CCTS-DTCatalogueVersion3p1.pdf>, 121 pages.

Wright, "JSON Schema: A Media Type for Describing JSON Documents" Internet Draft, Internet Engineering Task Force, Oct. 2016, 16 pages.

* cited by examiner

```
{
    "descriptor": {
        "contentId": "78A382FD-E2B6-4D27-9ED9-195777C21AED"
    },
    "content": {
        "namespace": "abc.crm.c4c",
        "name": "standard",
        "application": "abc.crm.c4c",
        "version": 1,
        "services": [
            {
                "fullName": "abc.crm.leadService",
                "excludes": {
                    "features": [
                        "abc.crm.lead.feature.sampleFeature1",
                        "abc.crm.lead.feature.sampleFeature1"
                    ],
                    "subscriptions": {
                        "events": [
                            "abc.crm.service.event.subEvent"
                        ]
                    }
                }
            },
            {
                "fullName": "abc.crm.opportunity.opportunityService",
                "excludeService" : "true"
            }
        ]
    }
}
```

604 (namespace), 604 (services), 606 (leadService block), 608 (opportunityService block), 610 (opportunityService fullName)

FIG. 6  600

```
"descriptor": {
  "contentId": "70EE62EF-BBB4-4506-8746-016F5287848"
},
"content": {
  "namespace": "abc.crm.service",
  "name": "leadService",          ⟵ 702
  "nodeType": "SERVICE",
  "properties": {},
  "childNodes": [],
  "childNodeRefs": [
    "abc.crm.leadservice.entity.lead",
    "abc.crm.leadservice.entity.leadNote",
    "abc.crm.leadservice.entity.leadSource",
    "abc.crm.leadservice.entity.leadStatus",
    "abc.crm.leadservice.event.leadCreate",
    "abc.crm.leadservice.event.leadUpdate",
    "abc.crm.leadservice.uiapp.lead",
    "abc.crm.leadservice.api.lead"
  ],
  "subscriptions": [
    "abc.crm.accountservice.event.accountCreate",
    "abc.crm.accountservice.event.accountUpdate"
  ],
```

FIG. 7  700

```
{
    "descriptor": {
        "contentId": "68D77739-XXXX-44A9-A361-ACD4020A52A7"
    },
    "content": {
        "namespace": "abc.crm.leadservice.uiapp",
        "name": "lead",
        "nodeType": "UIApp",
        "configNodeRef": "abc.crm.leadservice.uiapp.config.leadApp",
        "childNodeRefs": [
            "abc.crm.accountservice.uiapp.account",
            "abc.crm.contactservice.uiapp.contact"
        ]
    }
}
```

```json
{
  "description" : {
    "contextId" : "71777210-3A0-11EA-BC35-0242AC130003"
  },
  "context" : { },
  "namespaces" : "abc.com.leadservice.ulapp.config", "name": "leadapp",
  "nodeType" : "PARENT", "childNodes" : [
    {
      "namespace" : "abc.com.leadservice.ulapp.config.leadapp", "name": "ulAppConfig",
      "nodeType" : "CHILD", "properties" : {  ─── 902
        "classifier" : "namespace",
        "configJson" : {
          "source" : "modules/lead/lead-ui", "lead-ui": "com-lead-list", "routingKey": "lead-ui", "startComponent": "com-lead-list", "components": [ ─── 904
            {
              "customElement" : "com-lead-list", "label": "",  ─── 906
              "icon" : "",
              "rk" : "CRM_LEAD_UI"
            },
            {
              "customElement" : "com-lead-view", "label": "",
              "icon" : "",
              "rk" : "CRM_LEAD_UV"
            },
            "com-lead-detail"
          ]
        }
      }
    }
  ]
}
```

```
"descriptor": {
    "contentId": "007944BC-D2CF-4769-9408-8898F048CDD7"
},
"content": {
    "namespace": "abc.com.leadservice.uiview.config",
    "nodeType": "PARENT",
    "childNodes": [
        {
            "namespace": "abc.com.leadservice.uiview.config.leadlist",
            "name": "leadlist",
            "nodeType": "CHILD",
            "attributes": {
                "classifier": "UIDEF"
            },
            "fieldSets": [ {          ← 1102
                "configJson": {
                    "id": "307C8A88-1CB5-400C-A63F-F737B0487DDB",
                    "name": "leadlistColumns",
                    "entity": "abc.com.leadservice.entity.lead",  "path": "/",   ← 1106
                    "fields": [
                        {
                            "name": "leadName",   "label": "lbl_leadName",   "binding": "name",          "sequence": 1
                        },                                                                                            ← 1108
                        {
                            "name": "leadRole",
                            "label": "lbl_leadContactRole", "binding": "contactRole", "sequence": 2
```
                            ↑
                           1104

FIG. 11    1100

```
"descriptor": {
"contentid": "60800020-7A59-4FF4-81C1-8987CE917801"
},
"content": {
    "namespace": "abc.crm.leadservice.event",    —— 1202
    "name": "leadUpdate",
    "nodeType": "EVENT",
    "properties": {
        "trigger": "UPDATE"                      —— 1204
    },
    "childNodeRefs": {
        "abc.crm.leadservice.entity.lead"       —— 1206
    }
}
}
```

FIG. 12  1200

```
"descriptor": {
    "contentid": "15288326-308F-4806-ADA6-42095885DF"
},
"content": {
    "namespace": "sap.com.leadservice.entity",          ⸺ 1302
    "name": "lead",
    "nodeType": "ENTITY",
    "label": "LBL_LEAD"
    "properties": {},
    "childNodes": [                                       ⸺ 1304
        ...
    ]
}
```

FIG. 13  *1300*

```
"childNodes": [
    {
        "namespace": "abc.crm.leadservice.entity.lead.attribute",
1402    "name": "id",
        "nodeType": "ATTRIBUTE",
        "properties": [
            {
                "dataType": "string",
                "keyType" : "PRIMARY"
            }
        ]
    },
    {
        "namespace": "abc.crm.leadservice.entity.lead.attribute",
1404    "name": "name",
        "nodeType": "ATTRIBUTE",
        "label": "LBL_NAME",
        "properties": [
            {
                "dataType": "string"
            }
        ]
    },
    {
        "namespace": "abc.crm.leadservice.entity.lead.attribute",
1406    "name": "company",
        "label": "LBL_COMPANY",
        "nodeType": "ATTRIBUTE",
        "properties": [
            {
                "dataType": "string"
            }
        ]
    },
    {
        "namespace": "abc.crm.leadservice.entity.lead.attribute",
1408    "name": "contactRole",
1410    "label": "LBL_CONTACT_ROLE",
        "nodeType": "ATTRIBUTE",
        "properties": [
            {
                "dataType": "string"
            }
        ]
    },
```

FIG. 14  *1400*

```
{
    "descriptor": {
        "contentId": "638D02DC-7A59-4FF4-B1C1-8987CE917801"
    },
    "content": {
        "namespace": "abc.crm.leadservice.feature",
        "name": "leadFeature1",         1502
        "nodeType": "FEATURE",
        "label" : "lbl_feature_one",
        "properties": {},
        "childNodeRefs" : []
    }
}
```

FIG. 15  *1500*

```
{
  "descriptor": {
    "contentId": "8A8395F0-E5DF-11E9-BB90-4B15DCE083C3"
  },
  "content": {                    ╭─ 1602
    "name": "target",                              ╭─ 1604
    "namespace": "abc.crm.targetservice.api",
    "nodeType": "API",
    "configNodeRef": "abc.crm.targetservice.api.config.targetApi",
    "properties": {
      "apiPath": "/forecast-service/targets",  ╭─ 1606      ╮ 1608
      "apiStyle": "REST",
      "methods": "QUERY,READ,POST"
    }                                              ╰─ 1612
  },
  "childNodeRefs": [
    "abc.crm.targetservice.entity.target"
  ]                                                 ╰─ 1608
}
```
1610

FIG. 16   <u>1600</u>

```
{
  "descriptor": {
    "contentId": "A5C26188-98C4-11EA-BB37-0242AC130002" },
  "content": {
    "namespace": "abc.crm.targetservice.api.config",
    "name": "targetApi",
    "nodeType": "PARENT",
    "childNodes": [
      {
        "namespace": "abc.crm.targetservice.api.config.targetapi",
        "name": "apiConfig",
        "nodeType": "CHILD",
        "properties": [
          { "classifier": "APIDEF" }
        ],
        "configJson": {
          "operations": [                              ─1702
            {
              "id": "getTargets",         ─1704
              "method": "QUERY",
              "request": {                              ─1710
                "queryParams": [
                  {
                    "name": "territoryId",
                    "attributeRef":"abc.crm.targetservice.entity.target.territory.id"
                  }]
              },
              "responses": [
                { "responseCode": "200" },
                { "responseCode": "5XX" }]
            },
            {
              "id": "getTarget",
              "path": "/{id}",            ─1706
              "method": "READ",           ─1712
              "request": {
                "pathVariables": [
                  {
                    "name": "id",
                    "attributeRef": "abc.crm.targetservice.entity.target.id"
                  } ]
              },
              "responses": [
                { "responseCode": "200" },
                { "responseCode": "400" },
                { "responseCode": "5XX" } ]
            },
            {
              "id": "createTarget",       ─1708
              "method": "POST",           ─1714
              "responses": [
                { "responseCode": "201" }
              ]
            }
          ]
        }
      }
    ]
  }
}
```

1716 → "request"

1718 → "responses"

FIG. 17  1700

SYSTEM METAMODEL FOR AN EVENT-DRIVEN CLUSTER OF MICROSERVICES WITH MICRO FRONTENDS

TECHNICAL FIELD

The present disclosure relates to computer-implemented methods, software, and systems for defining and using a system metamodel for an event-driven cluster of microservices with micro frontends.

BACKGROUND

Applications or systems can use a microservice architecture. Each microservice can be fine-grained, providing a specific functionality. An application can be arranged as a collection of loosely-coupled microservices. Different microservices can be implemented using different programming languages or other technologies.

SUMMARY

The present disclosure involves systems, software, and computer implemented methods for defining and using a system metamodel for an event-driven cluster of microservices with micro frontends. An example method includes receiving a deployment package for a first microservice, wherein the deployment package includes first metadata definitions for the first microservice. The first metadata definitions include: at least one first reference to at least one service definition for at least one service, wherein the at least one service includes a first service; at least one second reference to at least one resource entity served by the first service; at least one third reference to at least one event subscribed to by the first service, where the at least one third reference includes a first event reference to a first event published by a second microservice; at least one fourth reference to at least one micro frontend that provides a user interface for the first service; and at least one fifth reference to at least one application programming interface (API) for performing operations on the at least one resource entity served by the first service. The method further includes: deploying the first microservice, wherein deploying includes processing the first metadata definitions to include the first metadata definitions in a system metamodel graph; activating the first microservice, wherein activating includes generating at least one event corresponding to including the first metadata definitions in the system metamodel graph; receiving a request for metadata corresponding to the first microservice; traversing the system metamodel graph to retrieve requested metadata for the first microservice based on the first metadata definitions included in the system metamodel graph; and providing the requested metadata in response to the request.

The method can further include receiving second metadata definitions for an application, wherein the application comprises a cluster of microservices including at least the first microservice and the second microservice, and wherein the second metadata definitions include a reference to the first microservice and a reference to the second microservice. The method can further include deploying and activating the application, wherein activating the application comprises incorporating the second metadata definitions into the system metamodel graph.

The system metamodel graph can include a node for each of the first microservice, the second microservice, each service definition, each resource entity, each API, each event, each micro frontend, and the application. A first node for the first service can be linked, in the system metamodel graph, to respective nodes for the application, the at least one micro frontend, the at least one API, the at least one event, and the at least one resource entity. The application can be an application variant that excludes a third microservice included in the system metamodel graph. The application can be an application variant that excludes at least one feature of the first microservice. Each resource entity can be associated with at least one attribute. Each attribute can be represented by a respective attribute node in the system metamodel graph. An attribute can refer to a locale terminology.

The method can further include: receiving a request for extending a first entity with a first extension field; adding a first node to the system metamodel graph corresponding to the first extension field; locating a second node in the system metamodel graph corresponding to the first entity; and extending the first entity by modifying the second node to link to the first node corresponding to the first extension field.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 illustrates an example application artifact.

FIG. 7 illustrates an example service artifact.

FIG. 8 illustrates an example UI application artifact.

FIG. 9 illustrates an example UI application configuration artifact.

FIG. 11 illustrates an example UI view configuration artifact.

FIG. 12 illustrates an example event artifact.

FIG. 13 illustrates an example entity artifact.

FIG. 14 illustrates an example child nodes section defining attributes for an entity.

FIG. 15 illustrates an example feature artifact.

FIG. 16 illustrates an example API artifact.

FIG. 17 illustrates an example API configuration artifact.

DETAILED DESCRIPTION

A system metamodel can be used to define a variety of types of components of a system, including services, APIs (Application Programming Interfaces), events, UI (User Interface) models, entities, and features. The system metamodel can be used to define a microstack, for example, that includes a system of microservices and micro frontends. The system metamodel can provide advantages over other approaches that may enable definition of microservices or micro frontends, but not a comprehensive model that encompasses microservices, micro frontends, and other elements.

The system metamodel can enable creation, updating, and reading of well-defined APIs (e.g., REST (REpresentational State Transfer), RPC (Remote Procedure Call), and others). For example, developers can use the system metamodel to define compatible contracts that define entities and make the entities available for consumers. Additionally, event functionality enabled by the system metamodel can enable microservices to subscribe to events of other microservices.

An application UI can use the system metamodel to bootstrap and navigate across micro frontends provided by different services. Different applications can use system metamodel (e.g., different applications can be bundled from a same cluster of microservices).

The system metamodel can configured so as to be extensible, for example by customers and partners. For instance, the system metamodel can enable extension fields. Additionally, UI flexibility can be achieved through use of the system metamodel.

The system metamodel can be provided in a non-prescriptive manner (e.g., language-independent). Other approaches (e.g., prescriptive models) may generate language-specific artifacts or require a specific programming model. The non-prescriptive approach can enable developers of microservices to choose languages and databases that best suit a problem being solved or a service being offered.

In general, the system metamodel can improve speed of development while ensuring a consistent system definition. The system metamodel can provide a single API-driven service for reading and modifying metadata describing a system. Accordingly, developers do not need to understand or interface with multiple models.

Figure 1:
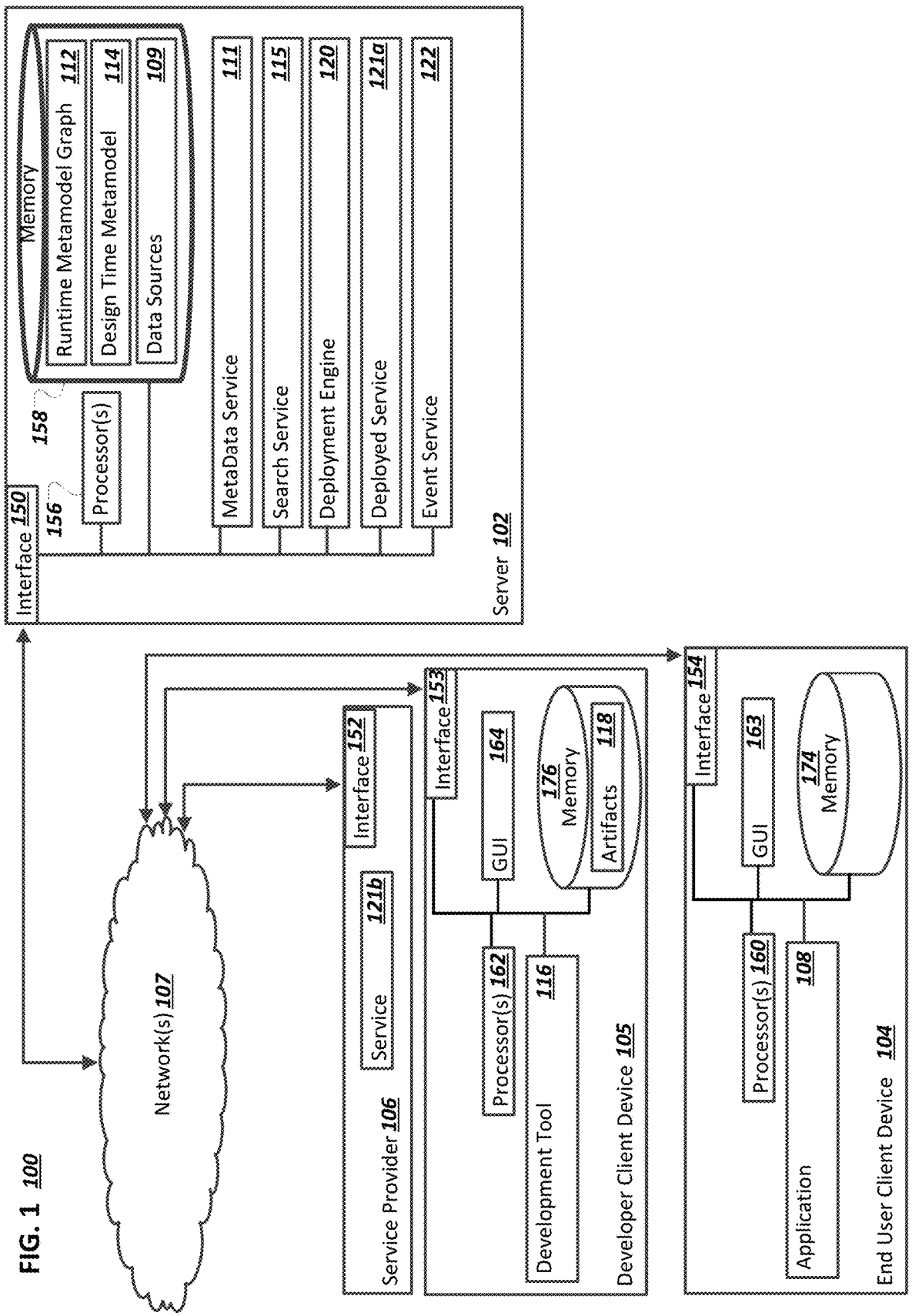
FIG. 1 is a block diagram illustrating an example system defining and using a system metamodel for an event-driven cluster of microservices with micro frontends.

FIG. 1 is a block diagram illustrating an example system 100 for defining and using a system metamodel for an event-driven cluster of microservices with micro frontends. Specifically, the illustrated system 100 includes or is communicably coupled with a server 102, an end user client device 104, a developer client device 105, a service provider 106, and one or more network(s) 107. Although shown separately, in some implementations, functionality of two or more systems or servers may be provided by a single system or server. In some implementations, the functionality of one illustrated system or server may be provided by multiple systems or servers. For example, although illustrated as a single server 102, the system 100 can include multiple application servers, a database server, a workflow server, a centralized services server, or some other combination of systems or servers.

The end user client device 104 can run an application 108 that uses loosely coupled microservices. Microservices can be provided by the service provider 106 (or other service provider(s)), or in some cases, the server 102. Microservices may access a data source 109 provided by the server 102 (or provided by another server or system). Microservices can be based on and/or use data provided by a system metamodel.

For example, the server 102 can include a metadata service 110 that can generate and provide access to a runtime system metamodel graph 112. The runtime system metamodel graph 112 can be generated from and be a runtime representation of a design time metamodel 114. The design time metamodel 114 can include information received from or provided by microservice developers. The design time metamodel 114 can include information describing microservices, application(s) that use, for example, a cluster of microservices, UI startup application(s) and UI views, entities (e.g., resources), entity attributes, terminologies (e.g., for locale-specific text values), feature flags, APIs, and events. The metadata service 111 can enable queries against the runtime metamodel graph 112, for example, to obtain information about model elements that may be stored in nodes of the runtime metamodel graph 112.

Example metadata queries can include querying for information for, among others: events being published by one or more services; event subscriptions for one or more services; a list of entities within a service (e.g. an opportunity service may serve both an opportunity header entity and an opportunity item entity); a list of attributes for a given entity; attribute property values (e.g., "creatable", "updatable" or attribute field labels); or a list of feature toggles supported by each service. In some implementations, the metadata service 111 provides metadata information to a search service 115, for example, to enable index-based searching for entity information.

The metadata service 111 can also allow for tenant-specific maintenance of the metadata (e.g., a given customer may wish to change a standard field to "Read-Only"'). Tenant-specific metadata can be used by appropriate consumers, such as UI components, to support extensibility & flexibility. For service features, the metadata service 111 can enable a customer to switch on or off feature toggles. As another example, a customer may wish to change metadata to affect field visibility for certain fields in the context of an application.

During authoring and deployment time, a developer can use a development tool 116 (e.g., a code editor) on the developer client device 105 to generate artifacts 118 that describe and/or define a microservice under development, such as by using annotations that are described in published guidelines provided by an operator of the server 102 (e.g., corresponding to a design time model 200 described below with respect to FIG. 2). The artifacts 118 can be provided to the server 102, the microservice can be deployed by a deployment tool 120, and metadata for the microservice can be incorporated by the metadata service 110 into the runtime system metamodel graph 112. The deployed microservice can be, for example, a service 121a provided by the server 102 (or by another server provided by the operator of the server 102) or a service 121b provided by the service provider 106.

In further detail, a deployment package can be received by the deployment engine 120 for a particular microservice. The deployment package can include metadata definitions for the particular microservice. The metadata definitions for the particular microservice can include the following, among others: one or more references to resource entity/entities served by the particular microservice; one or more references to event(s) subscribed to by the particular microservice (e.g., including an event reference to an published by another, different microservice); one or more references to micro frontend(s) that provide a user interface for the particular microservice; and one or more references to API(s) for performing operations on the resource entities served by the particular microservice.

The deployment engine 120 can deploy the particular microservice. Deploying the particular microservice can include processing the metadata definitions for the particular microservice to include the metadata definitions for the particular microservice in the runtime system metamodel graph 112. The runtime system metamodel graph 112 can include a node for each of the particular microservice, the other, different microservice, each resource entity, each API, each event, each micro frontend, and an application that uses the particular microservice and the other microservice. A node for the particular microservice can be linked, in the runtime system metamodel graph 112, to respective nodes for the application, the micro frontend(s), the API(s), the event(s), and the resource entities. Each resource entity can be associated with one or more attributes and each attribute can be represented by a respective attribute node in the runtime system metamodel graph 112. An attribute can refer to a locale terminology. Runtime system metamodel graph 112 nodes are described in more detail below with respect to FIG. 2.

The metadata service 111 can activate the particular microservice. Activating the particular microservice can include generating, by the event service 122, one or more events corresponding to including the metadata definitions for the particular microservice in the runtime system metamodel graph 112.

After the particular microservice has been deployed, the metadata service 111 can receive a request for metadata corresponding to the particular microservice. The metadata service 111 can traverse the runtime system metamodel graph 112 to retrieve requested metadata for the particular microservice based on the metadata definitions for the particular microservice that are included in the runtime system metamodel graph 112. The metadata service 111 can provide the requested metadata in response to the metadata request.

The design time metamodel 114 (and correspondingly, the runtime metamodel graph 112) can include information for events that are published by different services. An event service 122 can receive the event information for events that are published by respective services and notify consumers who have subscribed to events when events are raised.

In some implementations, an entity can be extended by adding attributes to that entity. An extension attribute can be created by the metadata service 111 in response to an extension request sent to the metadata service 111. An extension attribute request can be for a customer extension or a partner extension, for example. A customer or partner may wish to add a custom field to a standard entity, for example. As another example, an extension may modify an existing field, for example, to change a label, change attribute visibility (e.g., show or hide), or change another type of attribute property (e.g., read-only, mandatory, editable etc.). In some implementations, a service developer can specify which entities (and/or which attributes) within a service are enabled for extensibility. Naming prefixes can be used to ensure that a customer extension or partner extension are unique within a given environment. Extension requests can be specified, for example, using annotations and can therefore be configured, for example, by an administrator who does not have knowledge of complex coding that might be required for creating extensions in other environments.

At runtime, when, for example, a POST, PUT, or PATCH request is received by a service that includes an extension field, the service can query the metadata service 111 to obtain the extension attributes for the entity. If the extension attribute is defined in metadata and has properties that correspond to the received extension field, the service can store and/or use the extension field. If the extension attribute is not defined in metadata (or does not have expected attributes), the service can raise an error. As another example, when an object instance of an entity with an extension field is created at runtime, extensions can be included in an extensions node, with the extensions node including attributes as specified for extensions in the entity metadata.

As used in the present disclosure, the term "computer" is intended to encompass any suitable processing device. For example, although FIG. 1 illustrates a single server 102, a single end user client device 104, a single developer client device 105, and a single service provider 106, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, the end user client device 104, service provider 106, and the developer client device 105, respectively, for communicating with other systems in a distributed environment—including within the system 100—connected to the network 107. Generally, the interfaces 150, 152, 153, and 154 each comprise logic encoded in software and/or hardware in a suitable combination and operable to communicate with the network 107. More specifically, the interfaces 150, 152, 153, and 154 may each comprise software supporting one or more communication protocols associated with communications such that the network 107 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end user client device 104 and the developer client device 105 may each be any computing device operable to connect to or communicate in the network(s) 107 using a wireline or wireless connection. In general, each of the end user client device 104 and the developer client device 105 comprises an electronic computer device operable to receive, transmit, process, and store any appropriate data associated with the system 100 of FIG. 1. Each of the end user client device 104 and the developer client device 105 can include one or more client applications, including the application 108 or the development tool 116, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the developer client device 105 respectively include processor(s) 160 or processor(s) 162. Each processor 160 or 162 included in the end user client device 104 or the influencer tracking client device 105 may be a central processing unit (CPU), an application specific integrated circuit (ASIC), a field-programmable gate array (FPGA), or another suitable component. Generally, each processor 160 or 162 included in the end user client device 104 or the influencer tracking client device 105 executes instructions and manipulates data to perform the operations of the end user client device 104 or the influencer tracking client device 105, respectively. Specifically, each processor 160 or 162 included in the end user client device 104 or the influencer tracking client device 105 executes the functionality required to send requests to the server 102 and to receive and process responses from the server 102.

Each of the end user client device 104 and the developer client device 105 is generally intended to encompass any client computing device such as a laptop/notebook computer, wireless data port, smart phone, personal data assistant (PDA), tablet computing device, one or more processors within these devices, or any other suitable processing device. For example, the end user client device 104 and/or the developer client device 105 may comprise a computer that includes an input device, such as a keypad, touch screen, or other device that can accept user information, and an output device that conveys information associated with the operation of the server 102, or the client device itself, including digital data, visual information, or a GUI 163 or a GUI 164, respectively.

The GUI 163 and the GUI 164 each interface with at least a portion of the system 100 for any suitable purpose, including generating a visual representation of the application 108 or the development tool 116, respectively. In particular, the GUI 163 and the GUI 164 may each be used to view and navigate various Web pages. Generally, the GUI 163 and the GUI 164 each provide the user with an efficient and user-friendly presentation of business data provided by or communicated within the system. The GUI 163 and the GUI 164 may each comprise a plurality of customizable frames or views having interactive fields, pull-down lists, and buttons operated by the user. The GUI 163 and the GUI 164 each contemplate any suitable graphical user interface, such as a combination of a generic web browser, intelligent engine, and command line interface (CLI) that processes information and efficiently presents the results to the user visually.

Memory 174 and memory 176 respectively included in the end user client device 104 or the developer client device 105 may each include any memory or database module and may take the form of volatile or non-volatile memory including, without limitation, magnetic media, optical media, random access memory (RAM), read-only memory (ROM), removable media, or any other suitable local or remote memory component. The memory 174 and the memory 176 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end user client devices 104 and developer client devices 105 associated with, or external to, the system 100. Additionally, there may also be one or more additional client devices external to the illustrated portion of system 100 that are capable of interacting with the system 100 via the network(s) 107. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
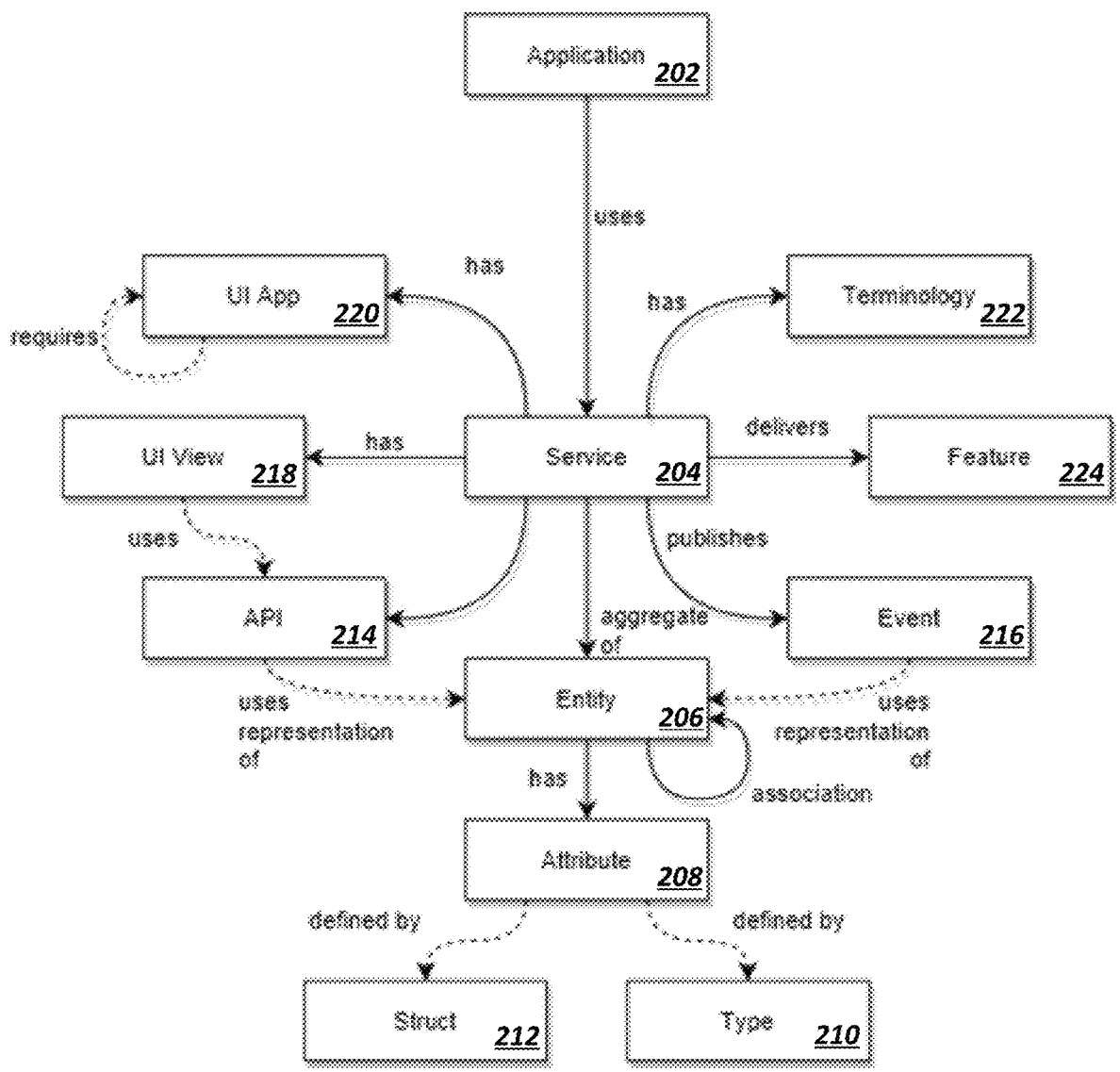
FIG. 2 illustrates a system metamodel.

FIG. 2 illustrates a system metamodel 200. The system metamodel 200 defines an architecture for applications that includes not only microservices, but also other artifacts, including micro frontends coupled to the microservices. The system metamodel 200 is a comprehensive model that describes an entire system associated with applications that use a cluster of microservices. The system metamodel 200 can describe the entire system while still maintaining a microservice goal of loosely-coupled microservices. The system metamodel 200 can be provided by a metadata service (e.g., the metadata service 111) that allows for navigation to and operations on the various artifacts described by the system metamodel 200. The metadata service can treat the metadata definition defined by the system metamodel 200 as a consumer contract, and can provide metadata information and operations in response to consumer requests.

An application artifact 202 represents an application. The system described by the system metamodel 200 can have one or more applications (and accordingly, the system metamodel 200 can have one or more application artifacts 202). The system can have a particular application that is identified as a default application. Each application can have different variants that may be configured, for example, based on product strategy, licensing, or other factors. Each application variant can be represented in the system metamodel 200 by a different application artifact 202. A given application and its variants can be associated with a particular tenant in a multi-tenant architecture.

An application can be built using multiple microservices, with each microservice running in its own process and communicating with other microservices (as needed) using lightweight mechanisms. Microservices can be built based on a set of capabilities (e.g., according to a domain-driven design). A microservice can be independently deployable (e.g., in an automated fashion). Different microservices can be defined in a same or different programming languages, use same or different storage technologies, and may have various differences and similarities, among others. Microservices can enable building and deploying independent components that work together in an application.

Although microservices may provide one service, a given microservice can provide multiple services. A service provided by a microservice can be defined as something that can be consumed by a customer of the service (e.g., by an application). Each application or application variant, therefore, can use one or more fine-grained services, each provided by a microservice. A service provided by a microservice is represented in the system metamodel 200 by a service artifact 204. An application artifact 202 therefore, can refer to multiple service artifacts 204.

As an example, a business partner microservice can provide services for business partners of an organization. However, a given business partner can be both a partner and a customer of the organization. A business partner microservice can provide both a customer service that provides customer role related functionality for business partners and a business partner service that provides business partner role-related functionality for business partners. As described in more detail below, each of the multiple services of the microservice can have its own set of APIs and its own set of events.

A service can serve (or use) an aggregate of entities (e.g., with each entity in the aggregate represented by an entity artifact 206). An aggregate entity, which can be a domain, can also be represented as an entity artifact 206 (e.g., a given entity artifact 206 can be an aggregate of other entity artifacts 206). That is, entity artifacts 206 can have references to other entity artifacts 206. For example, an order header entity artifact can refer to a set of line item entity artifacts. An entity artifact 206 can have references to other entities within the same service or across services. An entity artifact 206 can represent a resource that can be accessed from an API. Accordingly, the entity artifacts 206 in the system metamodel 200 can represent a publically-accessible model of data.

An entity artifact 206 can include a collection of attribute artifacts 208. An attribute artifact 206 can represent a field in an entity represented by an entity artifact 206, for example. Attribute values can be defined by data types. For instance, an attribute artifact 208 can represent a value defined by a specific type and/or in a specific structure. A type artifact 210 represents a simple (e.g., non-structure) data type of an attribute. A struct artifact 212 can be used to represent and reuse an object structure that is more complex than a simple data type. A struct artifact 212 can include references to multiple artifacts, of different data types (or structs), for example. The attributes in a struct artifact 212 can refer to different entities.

An aggregate (or an entity) can be consumed, for example, using APIs or events. An API is represented in the system metamodel 200 by an API artifact 214. Events are represented in the system metamodel 200 by an event artifact 216. An API artifact 214 can describe how a given API can be used to provide access to resource(s) described by an aggregate or entities in the aggregate. An API can be a REST API, for example. A service can publish an API.

An event (as represented by an event artifact 216) can also be published by a given service. Event consumers, which can be applications or other microservices, can subscribe to events using information described by the event artifacts 216. A runtime graph maintained by the metadata service can include an event subscription graph that represents a collection of event publishers and subscribers, of various event types, in the system.

API and event payloads can each include representations of an entity. In some cases, an API can be used to obtain information from related entities. For instance, an API that serves an opportunity aggregate can include a contact name of a contact, with the contact name being retrieved using a contact service of a business partner microservice. In some implementations, an event payload related to an opportunity aggregate, by comparison, may have a smaller payload, and may include a contact identifier but not a retrieved contact name.

As mentioned, the system metamodel 200 can represent micro frontends as well as microservices. A UI view artifact 218 can represent a UI view that can be used by end users to view aggregate and entity information. A UI view represents one or more sets of information that are presented to the user according to a given context or user perspective. UI views for a service can be delivered/defined by a team that is responsible for and develops the service. A UI view can use a API delivered by a service to obtain information to be presented in the UI view. A microservice can have multiple UI views that can be delivered as components. A UI view can be associated with one or more web components, for example, that can be reused by the application.

Each UI view can be associated with a UI application. In some implementations, a UI application represents a workspace. A UI application is represented in the system metamodel 200 by a UI application artifact 220. Each service can have one or more UI applications that can be used to launch the application represented by the application artifact 202. A UI application can correspond to a start/launch application.

When displaying information from aggregates or entities, terminologies provided by the service can be used by a UI view to obtain presentation information for the aggregate or entity. A terminology is represented in the system metamodel by a terminology artifact 222. Terminologies can be referenced, for example, in entity or attribute artifacts. For instance, a label of an attribute "name" in a "lead" entity can refer to an entry in a terminology for a lead service. A terminology artifact 222 can include translations of terms for different languages used in the system.

A given microservice, as mentioned, may offer multiple services, which can be viewed as features of the microservice. Services can be marked as available or unavailable by default. A feature artifact 224 can represent a feature flag that can be turned on or off to control availability of a given service/feature provided by a given microservice.

Figure 3:
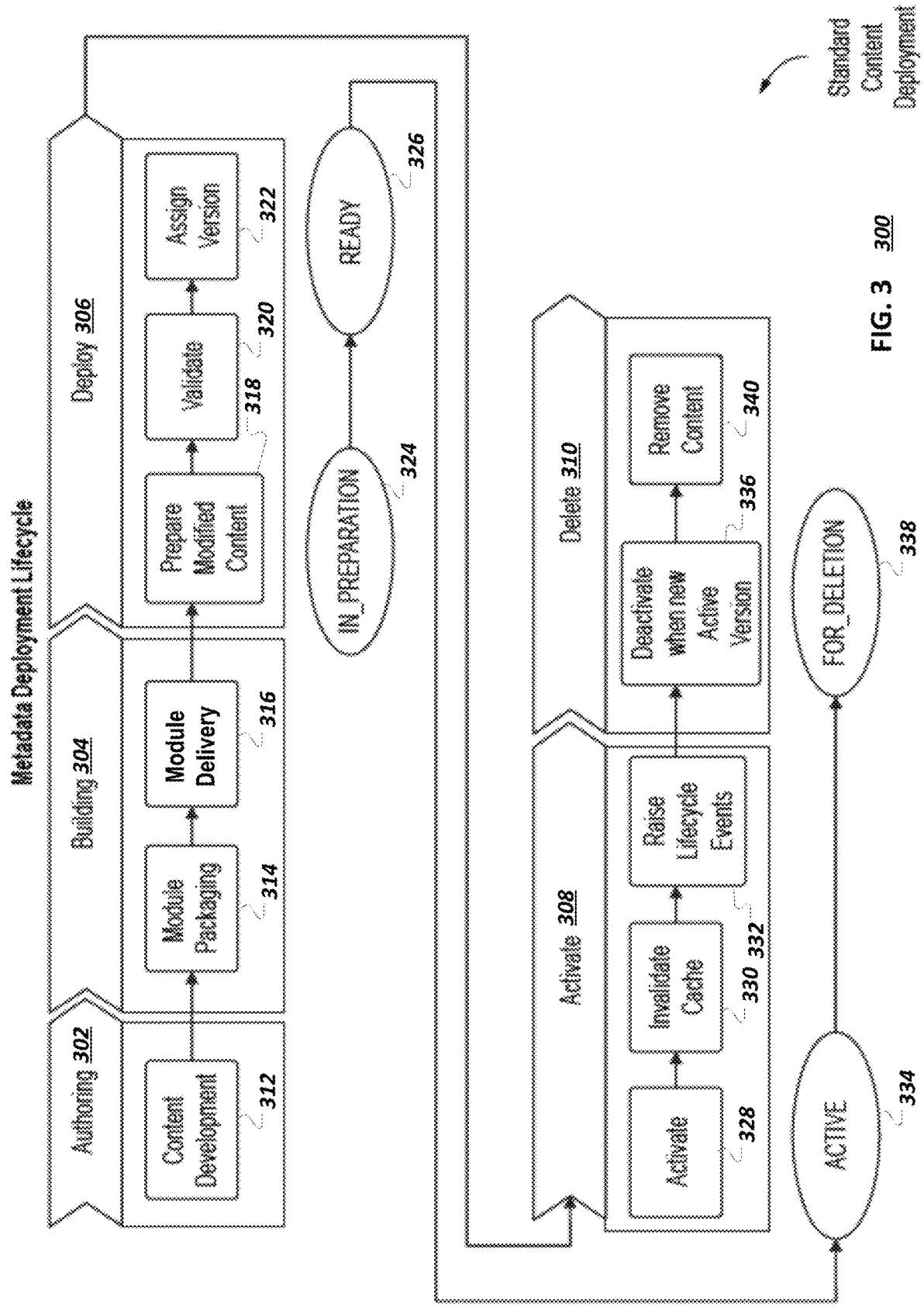
FIG. 3 illustrates an example metadata deployment lifecycle.

FIG. 3 illustrates an example metadata deployment lifecycle 300. The metadata deployment lifecycle 300 illustrates lifecycle phases for a microservice that is deployed to the system that uses the system metamodel. The metadata service can receive and process deployment of a microservice, for example. Each of multiple microservices can be deployed to the system and undergo the lifecycle phases described by the metadata deployment lifecycle 300.

The metadata deployment lifecycle 300 can include an authoring phase 302, a build phase 304, a deployment phase 306, an activation phase 308, and a deletion phase 310. Each lifecycle phase can include one or more stages. For example, the authoring phase 302 can include a content development stage 312. In the content development stage 312, metadata content is prepared for a service (e.g., by a developer using authoring tool(s)). Once the content has been authored, the content can be checked into a repository. The content can include artifacts developed in accordance with the system metamodel 200. Example artifacts are discussed below.

The build phase 304 includes a module packaging stage 314 and a module delivery stage 316. In the module packaging stage 314, a module (e.g., service) specific metadata-service build process can package the authored content into a separate container (e.g., job container) for deployment. In the module delivery stage 316, packaged content can be delivered for deployment.

The deployment phase 306 includes a preparation stage 318, a validation stage 320, and a versioning stage 322. The deployment stage 306 can take a service to be deployed from an in-preparation state 324 to a ready state 326. In the preparation stage 318, modified content (e.g., modified in the authoring phase 302) is identified and marked as in the in-preparation state 324. In the validation stage 320, content is validated for completeness and compatibility. In the versioning phase 322, a new build version can be assigned to the content and the content can be marked as in the ready state 324.

The activation stage 308 includes an activate stage 328, an invalidate cache stage 330, and an event raising stage 332. In the activate stage 328, after the content has been deployed, the content can be activated in the metadata service. The content can be marked as having an active state 334. In the invalidate cache stage 330, any cached information that may exist for activated metadata artifacts can be invalidated. In the event raising stage 332, events can be raised at the end of the activation stage 308 to inform consumers of the activated content. A search service can be a primary consumer of events raised at the end of the activation stage 308.

An attribute-created event can be raised when a new attribute is created. A created attribute can be either a standard attribute or an extension attribute. Extension attributes can have a property that indicates if the attribute is an extension. Extension attributes are described in more detail below. Other events can be raised when an attribute is updated or deleted. An entity-created event or an entity-updated event can be raised when a new entity is created or updated, respectively. A feature-created event or a feature-updated event can be raised when a new feature is created or updated, respectively.

The delete phase 310 can include a deactivation stage 336 and a content removal stage 338. The deactivation stage 336 can be performed when new content being activated is at a newer version of a same artifact as a currently deployed artifact. The deactivation stage 336 can include marking the older-version artifacts as being in a for-deletion state 338. The content removal stage 338 can include deleting the older-version content that is in the for-deletion state 338.

Figure 4:
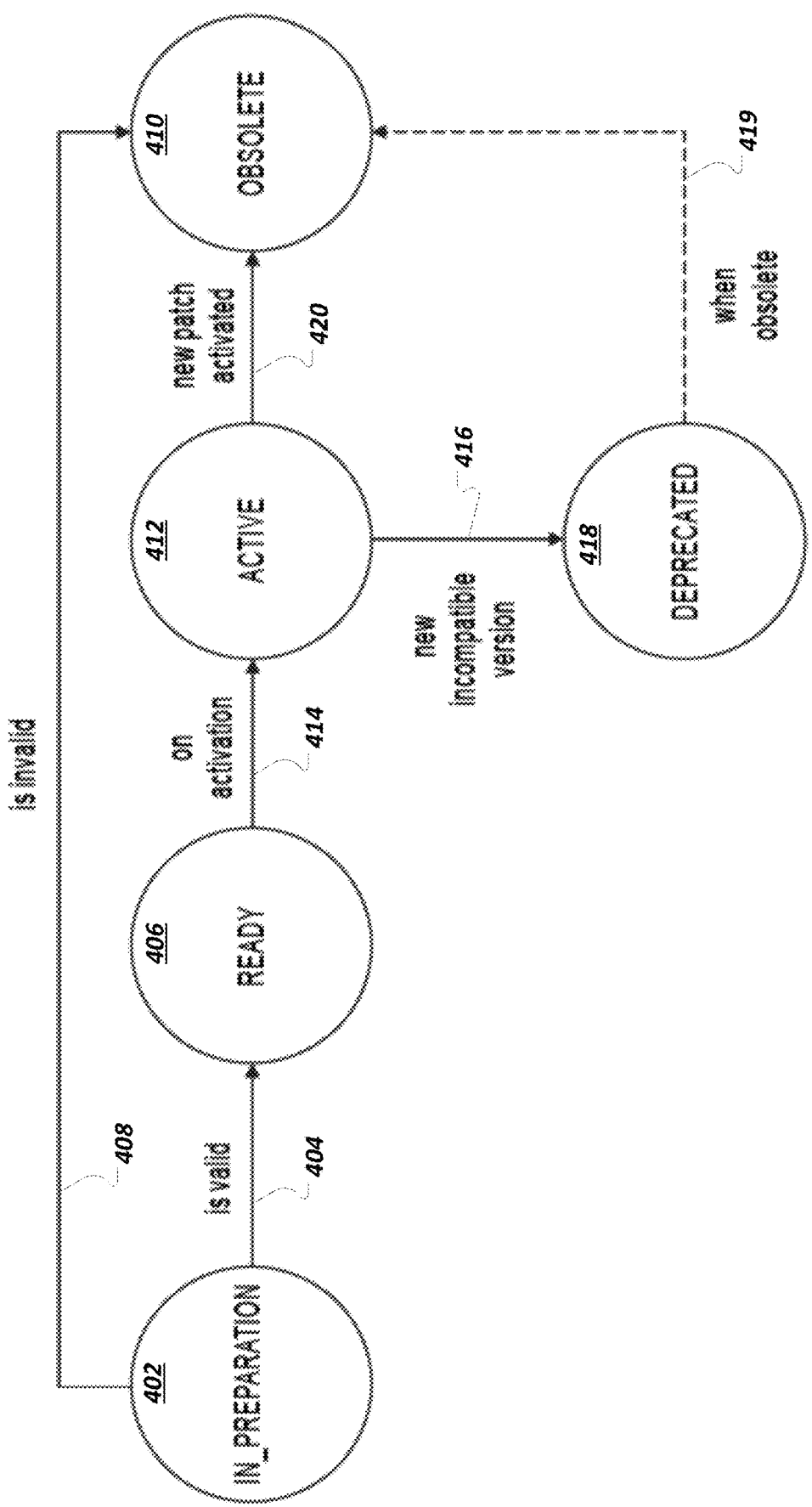
FIG. 4 illustrates lifecycle states for metadata nodes.

FIG. 4 illustrates lifecycle states 400 for metadata nodes. A metadata node can be a runtime representation of an artifact described in the design time system metadata model, for example. A node can first be in an in-preparation state 402. The in-preparation state 402 can apply to deployed nodes before the nodes are validated. The in-preparation state can be primarily used for staging nodes before nodes are activated. A validation process can be performed for nodes in the in-preparation state 402. An is-valid validation result 404 for a node can result in the node transitioning to a ready state 406. An is-invalid validation result 408 for a node can result in the node transitioning to an obsolete state 410.

Nodes in the ready state 406 can undergo an activation process. Nodes can be transitioned to an active state 412 in response to a successful activation result 414. In response to a new incompatible version event 416, a node can be transitioned to a deprecated state 418. Nodes in the deprecated state 418 can be transitioned to the obsolete state 410 (e.g., at a later time when an is-obsolete event 419 occurs). As another example, in response to a new patch installation event 420, a node can be transitioned to the obsolete state 410. Nodes in the obsolete state 410 can be removed from the system.

Figure 5:
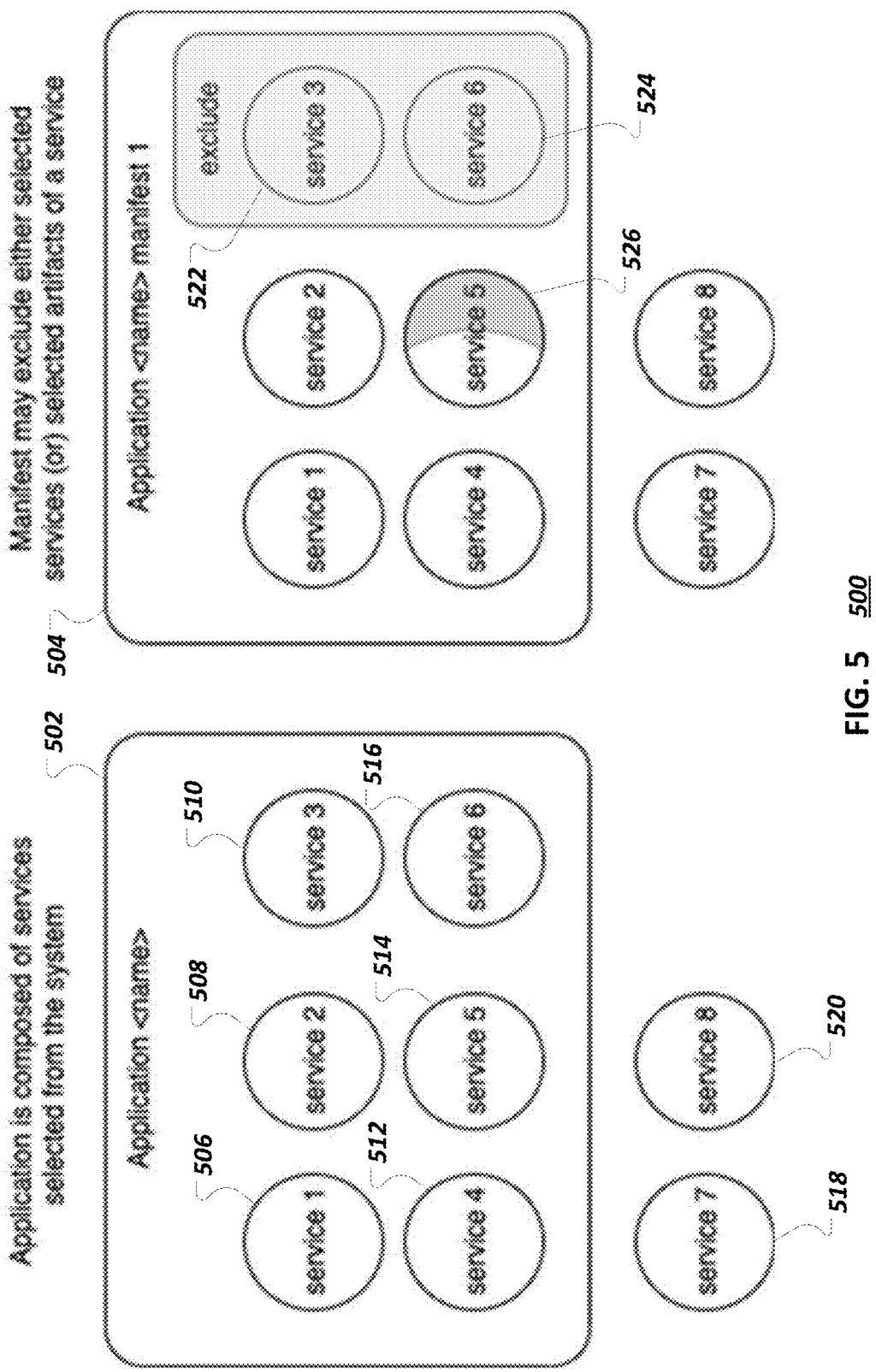
FIG. 5 illustrates an application and an application variant.

FIG. 5 illustrates an application 502 and an application variant 504. As mentioned, an application is a logical package that identifies a grouping of services that are offered to the customer. The system can have multiple applications configured and provisioned for a customer. An application can have different variants. For instance, a particular application may have variants of standard, professional, and enterprise. Depending on the variant, some services may be excluded from the application. As another example, some services may be included but some artifacts like features, events, etc. may be excluded. Over time, in response to an evolving of variant needs, different versions of the variants can be created.

The application 502 can include a set of services (service 1 506, service 2 508, service 3 510, service 4 512, service 5 514, and service 6 516) that have been selected from the system. The application 502 does not need or include service 7 518 or service 8 520. The application variant 504, which may be a more lightweight version of the application, may not need as many services or features. Accordingly, a manifest for the application variant 504 can exclude service 3 (shown as an excluded service 3 522) and service 6 (shown as an excluded service 6 524). Additionally, the application variant 504 may need only a portion of features of service 5. Accordingly, the manifest can specify to exclude a portion 526 of service 5 features.

FIG. 6 illustrates an example application artifact 600. The application artifact 600 is for an "abc.crm.c4c" application. The application artifact 600 includes a reference 604 to a "abc.crm.leadservice" service. An excludes section 606 can be used to prevent certain features of the leadservice service from being used by the application. An "excludeService" setting 608 can be used to exclude an "abc.crm.opportunity.opportunity Service" service 610 from being used by the application (e.g., to create an application variant).

FIG. 7 illustrates an example service artifact 700. A service artifact can represent a microservice. A service artifact can be considered a core artifact of the system model and can primarily include references to other metadata definitions, corresponding to relationship lines connecting to the service artifact 204 illustrated in the system metamodel 200 of FIG. 2. The service artifact 700 defines a "leadservice" service 702 in an "abc.crm.service" namespace 704. A "childnodeRefs" section 706 includes references to other metadata definitions, including entities, UI application(s), events, and APIs associated with the service. A subscriptions section 708 lists events to which the service is subscribed. If a service subscribes to its own events (e.g., events the service itself raises), subscriptions to self-generated events can also be listed in the subscriptions section 708. Subscribing to self-generated events can be used, for example, in scenarios where an operation is broken up into two or more asynchronous portions using events.

FIG. 8 illustrates an example UI application artifact 800. A UI application artifact can represent a micro-frontend application. A UI application artifact can include multiple components (e.g., UI views) that are delivered as part of the UI application. A UI application artifact can represent, for example, a collection of code (e.g., JavaScript) for the application. The UI application artifact 800 is for a UI application with a name 802 of "lead" in an "abc.crm.leadservice.uiapp" namespace 804. A "childNodeRefs" section 806 includes references of child nodes, with each child node describing a subcomponent of the UI application. Dependencies, including child node references, that are included in a UI application artifact can be translated into runtime dependencies. For instance, when a UI application is loaded, dependencies can be pre-loaded as required.

The UI application artifact 800 can include a configuration node reference 808. A configuration can be used to configure the UI application as a workspace (e.g., end user) application or an administrative application, for example.

FIG. 9 illustrates an example UI application configuration artifact 900. A classification setting 902 can be used to configure a UI application as a workspace (e.g., end user) application. A components collection 904 can list the components that are delivered as part of the UI application. A "startComponent" item 906 can indicate a default component to be loaded when launching the UI application.

Figure 10:
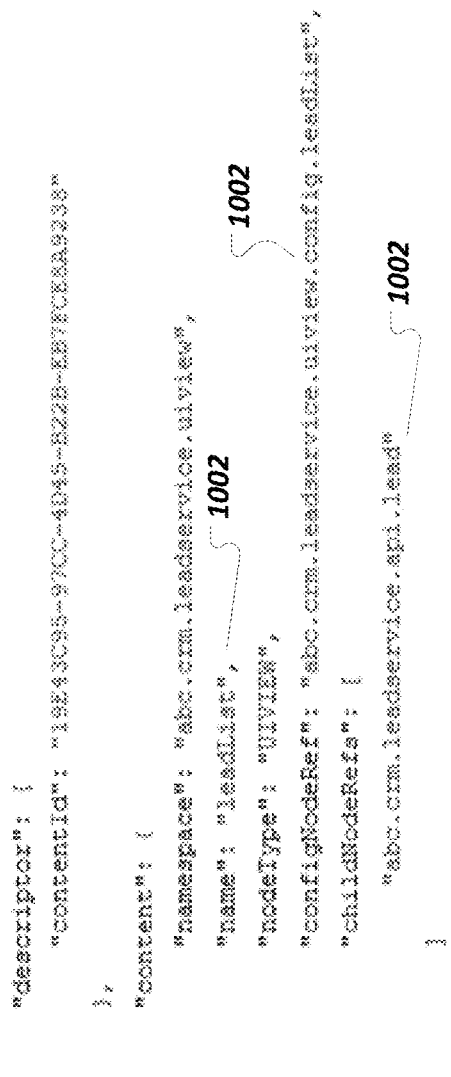
FIG. 10 illustrates an example UI view artifact.

FIG. 10 illustrates an example UI view artifact 1000. A UI view is a UI component that can be invoked independently and has its own behavior (e.g., for both UI rendering and data binding). A UI view may be typically assembled from multiple components. A UI view can allow a user to perform self-contained operations on an entity using a UI. In some implementations, respective UI components, rather than the UI view itself, may specify, e.g., web components to be rendered. The UI view artifact 1000 is for a "leadlist" UI view 1002. The UI view artifact 1000 includes a reference 1004 to an API that can be used for primary binding of the UI view. The UI view artifact 1000 includes a reference 1006 to a "abc.crm.leadservice.uiview.config.leadList" UI view configuration.

FIG. 11 illustrates an example UI view configuration artifact 1100. A UI view configuration can include the specification of one or more field sets. Field sets can be used for configuring the attributes of the entity may be rendered in the UI. Field sets can enable dynamic rendering of fields. A field set can represent a collection of fields and can be bound to an entity and include fields from the bound entity. Field that are specified by a field set can include a name, a label, a name of a binding attribute in the entity bound to the field set, binding properties, and a hidden setting that indicates whether the field is hidden. The UI view configuration artifact 1100 includes a field sets collection 1102 that includes a field set 1104 for a lead entity. The field set 1104 includes a "leadName" field 1106 and a "leadRole" field 1108.

FIG. 12 illustrates an example event artifact 1200. Events that are published by a service can be modeled in metadata definitions included in the event artifact 1202. When an event is published, an event payload may or may not be present. An event payload can be defined by the entity metadata and can be referred to in an event artifact. The event artifact 1202 is for a leadUpdate event 1204. A trigger property 1204 indicates that an update action triggers the leadUpdate event. Triggers can also include data creation or deletion, for example. The event artifact 1202 includes a reference 1206 to a lead entity that includes event payload information.

As mentioned, an event service can receive events that are published by individual services and notify the consumers who have subscribed to those events. The information regarding publishers and subscribers can be retrieved from metadata and used by the event service for event processing. In some implementations, events can be linked to a service (as described above) rather than to an entity. A raised event can deliver a payload that is defined by an entity, but the event itself can be linked (in metadata) directly to the service that raises the event.

FIG. 13 illustrates an example entity artifact. An entity represents a resource associated with a service. An entity can include references to other entities. A reference entity may be implemented as an embedded document or may be implemented as a separate collection in a same microservice or in a different microservice.

The entity artifact 1300 is for a lead entity 1302. An entity can include attributes (and can be considered as a collection of attributes). Attributes for the lead entity 1302 can be defined in a child nodes section 1304 (which is shown in FIG. 14).

FIG. 14 illustrates an example child nodes section 1402 defining attributes for an entity. The child nodes section 1402 can be a fully-displayed version of the child nodes section 1304, for example, as attributes for a lead entity. Id 1402, name 1404, company 1406, and contact role 1408 attributes are included in the child nodes section 1402. The id attribute is configured as a primary key of the lead entity.

Attributes can include a label that refers a key-value pair defined in a terminologies artifact. A terminologies artifact can be implemented as a properties file that includes a list of key-value pairs, with a key being a label identifier and a value being a text value associated with the key. Terminologies can be used to define different text values for different locales, for example. The contact role attribute 1408 refers to a LBL_CONTACT_ROLE label 1410. The LBL_CONTACT_ROLE label 1410 can be included in a properties file in a key-value pair, such as "LBL_CONTACT_ROLE=Role".

An attribute can represent a field of the entity. An attribute can have a data type and additional properties that define the behavior of the attribute. Attribute data types can include string, Boolean, number, date/time, object, array, or integer, to name a few examples. Attribute properties can include, data type, data format, item data type (for arrays), enumerated values (for enumerations), and key type (for fields that are primary or foreign keys). As another example, an isextension property can indicate that a field is an extension field.

FIG. 15 illustrates an example feature artifact 1500. A feature artifact can represent a feature flag that can be turned on or off to control availability of a given service/feature provided by a given microservice. The feature artifact 1500 is for a "feature1" feature of a lead service. At run-time, feature values (e.g., indicating whether given features are configured or not configured) can be retrieved using an endpoint provided by the service.

FIG. 16 illustrates an example API artifact 1600. An API artifact can be a definition of how resources are served by a service. An API defines the possible ways for the user to perform operations on an entity using the service. In some implementations, Open API definitions can be generated by the metadata service based on API metadata included in the API artifact. An API definition in an API artifact can include specification of various operations on specified paths. A configuration section (e.g., config JSON (JavaScript Object Notation) section) can be used for defining operations with respect to API end-points.

The API artifact 1600 is for a target API 1602 in an "abc.crm.targetservice.api.config.targetapi" namespace 1604. An API path 1606 specifies a relative path from the service to a primary resource for the API. A target entity 1608 has been specified as the primary resource. An API style 1610 specifies that the API is a REST API. A methods list 1612 specifies supported method types (e.g., QUERY, READ, and POST). A configuration node reference 1614 specifies a configuration node in which further API details are configured.

FIG. 17 illustrates an example API configuration artifact 1700. An operations section 1702 includes information for operations supported by the API. For example, the operations section 1702 includes a getTargets operation 1704, a getTarget operation 1706, and a createTarget operation 1708. The getTargets operation 1704 is specified as method type QUERY 1710, the getTarget operation 1706 is specified as method type READ 1712, and the createTarget operation 1708 is specified as method type POST 1714. Each operation can include request and/or response settings. For example, the getTargets operation 1705 includes request settings 1716 and response settings 1718.

Figure 18:
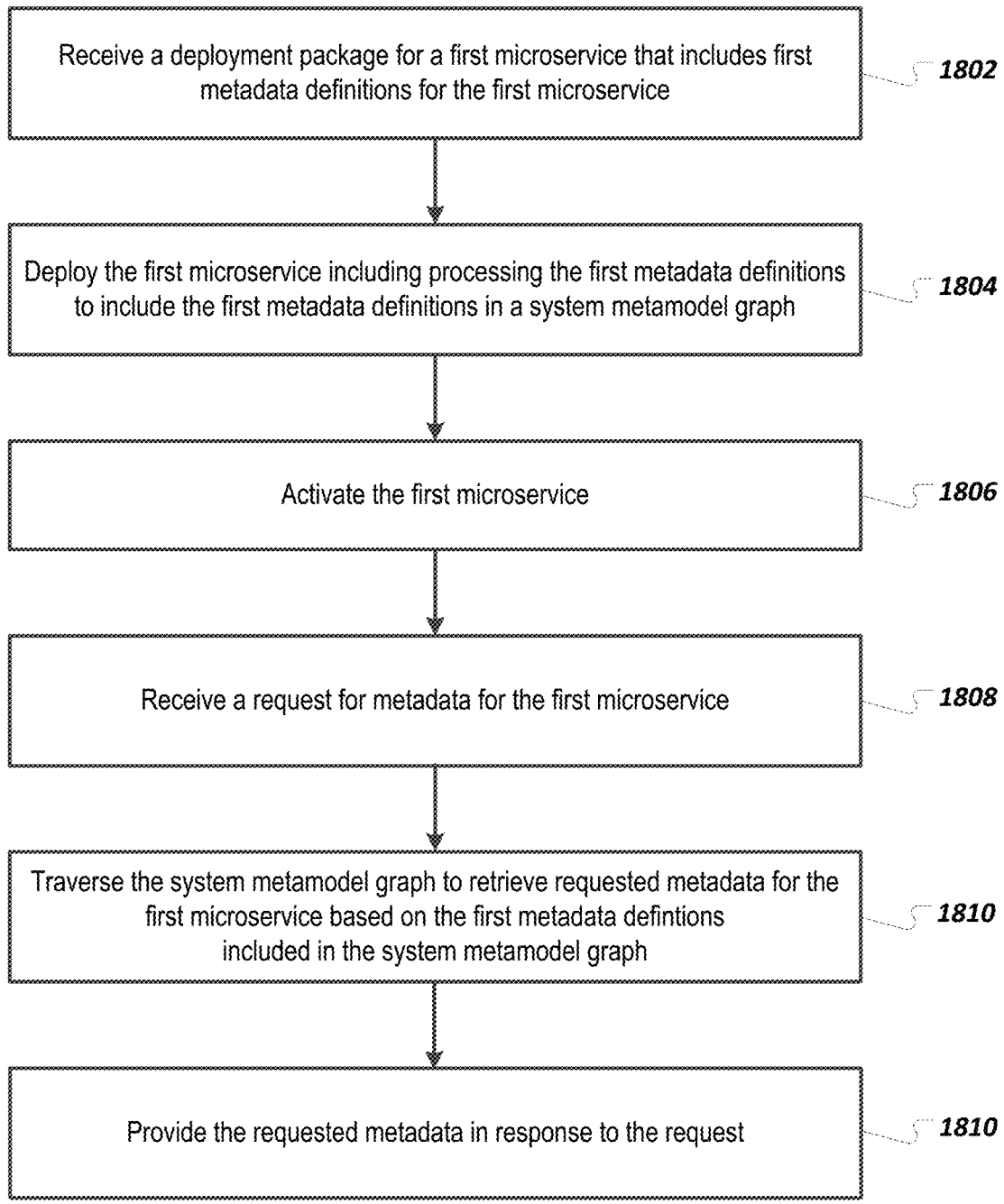
FIG. 18 is a flowchart of an example method for a metadata service.

FIG. 18 is a flowchart of an example method for a metadata service. It will be understood that method 1800 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 1800. In some implementations, the method 1800 and related methods are executed by one or more components of the system 100 described above with respect to FIG. 1.

At 1802, a deployment package is received for a first microservice. The deployment package includes first metadata definitions for the first microservice. The first metadata definitions include: at least one first reference to at least one service definition for at least one service, including a first service; at least one second reference to at least one resource entity served by the first service; at least one third reference to at least one event subscribed to by the first service, where the at least one third reference includes a first event reference to a first event published by a second microservice; at least one fourth reference to at least one micro frontend that provides a user interface for the first service; and at least one fifth reference to at least one application programming interface for performing operations on the at least one resource entity served by the first service.

At 1804, the first microservice is deployed. Deploying includes processing the first metadata definitions to include the first metadata definitions in a system metamodel graph. The system metamodel graph can include a node for each of the first service, the first service, the second microservice, each resource entity, each API, each event, each micro frontend, and an application that uses the first microservice and the second microservice. A first node for the first microservice can be linked, in the system metamodel graph, to respective nodes for the application, the first service, the at least one micro frontend, the at least one API, the at least one event, and the at least one resource entity. Each resource entity can be associated with at least one attribute and each attribute can be represented by a respective attribute node in the system metamodel graph. An attribute can refer to a locale terminology.

At 1806, the first microservice is activated. Activating includes generating at least one event corresponding to including the first metadata definitions in the system metamodel graph.

At 1808, a request is received for metadata corresponding to the first microservice.

At 1810, the system metamodel graph is traversed to retrieve requested metadata for the first microservice based on the first metadata definitions included in the system metamodel graph.

At 1812, the requested metadata is provided in response to the request.

Additionally, second metadata definitions can be received for the application. The application can correspond to a cluster of microservices including at least the first microservice and the second microservice. The second metadata definitions can include a reference to the first microservice and a reference to the second microservice. The application can be deployed and activated. Activating the application can include incorporating the second metadata definitions into the system metamodel graph. In some implementations, the application is an application variant that excludes a third service included in the system metamodel graph. In some implementations, the application is an application variant that excludes at least one feature of the first service.

As another example, a request can be received for extending a first entity with a first extension field. A first node can be added to the system metamodel graph that corresponds to the first extension field. A second node in the system metamodel graph corresponding to the first entity can be located. The first entity can be extended by modifying the second node to link to the first node corresponding to the first extension field.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a deployment package for a first microservice, wherein the deployment package includes first metadata definitions for the first microservice, and wherein the first metadata definitions include:
at least one first reference to at least one service definition for at least one service, wherein the at least one service includes a first service;
at least one second reference to at least one resource entity served by the first service;
at least one third reference to at least one event subscribed to by the first service, where the at least one third reference includes a first event reference to a first event published by a second microservice;
at least one fourth reference to at least one micro frontend that provides a user interface for the first service; and
at least one fifth reference to at least one application programming interface (API) for performing operations on the at least one resource entity served by the first service;
deploying the first microservice, wherein deploying includes processing the first metadata definitions to include the first metadata definitions in a system metamodel graph,
wherein the system metamodel graph includes a node for each of the first microservice, the second microservice, each service definition, each resource entity, each API, each event, each micro frontend, and an application that comprises a cluster of microservices includes at least the first microservice and the second microservice, and wherein a first node for the first service is linked by respective links, in the system metamodel graph, to respective nodes for the application, the at least one micro frontend, the at least one API, the at least one event, and the at least one resource entity;
activating the first microservice, wherein activating includes generating at least one event corresponding to including the first metadata definitions in the system metamodel graph;
receiving a request for metadata corresponding to the first microservice;
traversing the system metamodel graph to retrieve requested metadata for the first microservice based on the first metadata definitions included in the system metamodel graph, wherein the traversing includes traversing each of the respective links for the first node to obtain information from the respective nodes linked to the first node; and
providing the requested metadata in response to the request.

2. The computer-implemented method of claim 1, further comprising receiving second metadata definitions for an application, wherein the application comprises a cluster of microservices including at least the first microservice and the second microservice, and wherein the second metadata definitions include a reference to the first microservice and a reference to the second microservice.

3. The computer-implemented method of claim 2, further comprising deploying and activating the application, wherein activating the application comprises incorporating the second metadata definitions into the system metamodel graph.

4. The computer-implemented method of claim 2, wherein the application comprises an application variant that excludes a third microservice included in the system metamodel graph.

5. The computer-implemented method of claim 2, wherein the application comprises an application variant that excludes at least one feature of the first microservice.

6. The computer-implemented method of claim 1, wherein each resource entity is associated with at least one attribute and wherein each attribute is represented by a respective attribute node in the system metamodel graph.

7. The computer-implemented method of claim 6, wherein at least one attribute refers to a locale terminology.

8. The computer-implemented method of claim 1, further comprising:
receiving a request for extending a first entity with a first extension field;
adding a first node to the system metamodel graph corresponding to the first extension field;
locating a second node in the system metamodel graph corresponding to the first entity; and
extending the first entity by modifying the second node to link to the first node corresponding to the first extension field.

9. A system comprising:
one or more computers; and
a computer-readable medium coupled to the one or more computers having instructions stored thereon which, when executed by the one or more computers, cause the one or more computers to perform operations comprising:
receiving a deployment package for a first microservice, wherein the deployment package includes first metadata definitions for the first microservice, and wherein the first metadata definitions include:
at least one first reference to at least one service definition for at least one service, wherein the at least one service includes a first service;
at least one second reference to at least one resource entity served by the first service;
at least one third reference to at least one event subscribed to by the first service, where the at least one third reference includes a first event reference to a first event published by a second microservice;
at least one fourth reference to at least one micro frontend that provides a user interface for the first service; and
at least one fifth reference to at least one application programming interface (API) for performing operations on the at least one resource entity served by the first service;
deploying the first microservice, wherein deploying includes processing the first metadata definitions to include the first metadata definitions in a system metamodel graph, wherein the system metamodel graph includes a node for each of the first microservice, the second microservice, each service definition, each resource entity, each API, each event, each micro frontend, and an application that comprises a cluster of microservices includes at least the first microservice and the second microservice, and wherein a first node for the first service is linked by respective links, in the system metamodel graph, to respective nodes for the application, the at least one micro frontend, the at least one API, the at least one event, and the at least one resource entity;
activating the first microservice, wherein activating includes generating at least one event corresponding to including the first metadata definitions in the system metamodel graph;
receiving a request for metadata corresponding to the first microservice;

traversing the system metamodel graph to retrieve requested metadata for the first microservice based on the first metadata definitions included in the system metamodel graph, wherein the traversing includes traversing each of the respective links for the first node to obtain information from the respective nodes linked to the first node; and providing the requested metadata in response to the request.

10. The system of claim 9, wherein the operations further comprise receiving second metadata definitions for an application, wherein the application comprises a cluster of microservices including at least the first microservice and the second microservice, and wherein the second metadata definitions include a reference to the first microservice and a reference to the second microservice.

11. The system of claim 10, wherein the operations further comprise deploying and activating the application, wherein activating the application comprises incorporating the second metadata definitions into the system metamodel graph.

12. A computer program product encoded on a non-transitory storage medium, the product comprising non-transitory, computer readable instructions for causing one or more processors to perform operations comprising:

receiving a deployment package for a first microservice, wherein the deployment package includes first metadata definitions for the first microservice, and wherein the first metadata definitions include:

at least one first reference to at least one service definition for at least one service, wherein the at least one service includes a first service;

at least one second reference to at least one resource entity served by the first service;

at least one third reference to at least one event subscribed to by the first service, where the at least one third reference includes a first event reference to a first event published by a second microservice;

at least one fourth reference to at least one micro frontend that provides a user interface for the first service; and at least one fifth reference to at least one application programming interface (API) for performing operations on the at least one resource entity served by the first service;

deploying the first microservice, wherein deploying includes processing the first metadata definitions to include the first metadata definitions in a system metamodel graph, wherein the system metamodel graph includes a node for each of the first microservice, the second microservice, each service definition, each resource entity, each API, each event, each micro frontend, and an application that comprises a cluster of microservices includes at least the first microservice and the second microservice, and wherein a first node for the first service is linked by respective links, in the system metamodel graph, to respective nodes for the application, the at least one micro frontend, the at least one API, the at least one event, and the at least one resource entity;

activating the first microservice, wherein activating includes generating at least one event corresponding to including the first metadata definitions in the system metamodel graph; receiving a request for metadata corresponding to the first microservice;

traversing the system metamodel graph to retrieve requested metadata for the first microservice based on the first metadata definitions included in the system metamodel graph, wherein the traversing includes traversing each of the respective links for the first node to obtain information from the respective nodes linked to the first node; and providing the requested metadata in response to the request.

13. The computer program product of claim 12, wherein the operations further comprise receiving second metadata definitions for an application, wherein the application comprises a cluster of microservices including at least the first microservice and the second microservice, and wherein the second metadata definitions include a reference to the first microservice and a reference to the second microservice.

14. The computer program product of claim 13, wherein the operations further comprise deploying and activating the application, wherein activating the application comprises incorporating the second metadata definitions into the system metamodel graph.

* * * * *